United States Patent [19]

Tucker

[11] 3,848,097

[45] Nov. 12, 1974

[54] TELEPHONE WALL MOUNT

[75] Inventor: Council A. Tucker, Los Angeles, Calif.

[73] Assignee: American Telecommunications Corporation, El Monte, Calif.

[22] Filed: Apr. 9, 1973

[21] Appl. No.: 348,955

[52] U.S. Cl. .......... 179/146 R
[51] Int. Cl. .......... H04m 1/11
[58] Field of Search .......... 179/146 R, 178

[56] References Cited

UNITED STATES PATENTS

| | | | |
|---|---|---|---|
| 1,813,887 | 7/1931 | Cadieux | 179/100 R |
| 3,213,210 | 10/1965 | Samples | 179/146 R X |

*Primary Examiner*—William C. Cooper
*Attorney, Agent, or Firm*—Christie, Parker & Hale

[57] ABSTRACT

A mount for a wall telephone is attached to a permanently fixed telephone outlet by engaging a guide of the mount with a face plate of the outlet and swinging the mount about a rotational axis of the guide towards the outlet. Magnets on the mount engage a striker plate of the outlet to secure the mount onto the outlet. A cord adapter having male stabs is in the mount and floats there so that the stabs can find receptacles in a jack mounted in the outlet. A trigger having a relatively large mechanical advantage allows the mount to be removed from the outlet.

12 Claims, 4 Drawing Figures

TELEPHONE WALL MOUNT

BACKGROUND OF THE INVENTION

The present invention relates in general to the art of telephones and, more in particular, to an apparatus which is useful for mounting a telephone to a wall.

Wall mounted telephones are popular in a variety of locations, for example, in a kitchen or workshop. Very simply, wall mounted telephones are mounted on a wall at a convenient height for the proprietor of the telephone.

It has been suggested that with the increased use of telephones, several permanently installed telephone outlets be provided for a telephone subscriber. The subscriber would then merely purchase whatever telephone equipment desired and install the equipment in the desired locations. Even in the instance where the telephone company installs the telephone equipment, a facility having several permanent outlets enjoys the advantages of easy telephone installation, maintenance and flexibility in changing telephone location.

While a provision of several telephone outlets in and of itself affords considerably greater flexibility than having a new telephone outlet wired to each desired location every time a change of telephone location is desired, the concept suffers unless some means can be provided to enable the installation of a telephone to a permanently installed outlet without rewiring or wiring the telephone to the outlet. Clearly, a plug and jack for the telephone instrument and wall connection, respectively, provide an ideal mechanism for telephone installation without wiring.

In wall mounted telephone units, however, it is necessary that the telephones be mounted flush against the wall and that some provision be made to carry the considerable weight of the telephone. For appearance sake, it is also required that the plug and jack not be visible after a wall mounted telephone is installed. Because of the appearance requirement, it is desirable to have the plug and jack masked by the telephone instrument proper. This presents the problem of making the connection between the telephone instrument and the telephone outlet during the mounting of the telephone instrument flush against the wall. Moreover, the considerable weight of the telephone instrument cannot be borne by the plug and jack.

Accordingly, there is a need for a means to mount a telephone instrument flush against a vertical wall while at the same time coupling the telephone instrument through a plug with a telephone outlet to a jack, and to support the telephone instrument essentially independently of the plug and plug receptacle.

SUMMARY OF THE INVENTION

The present invention provides a wall mount for a telephone instrument which is capable of completely masking a telephone outlet while being flush with the wall onto which the telephone is to be mounted. The wall mount is characterized in its ease of installation and removal for service and relocation. The wall mount is capable of sustaining the load of the telephone independently of a plug and jack used to interconnect the telephone instrument with the telephone outlet.

In general, the present invention contemplates a base upon which a telephone instrument can be secured. The base contains magnet means for securing the base to a telephone wall outlet, means for removing the mount, and means to effect a connection between a telephone instrument and telephone service lines through a plug and jack.

More specifically, the present invention contemplates the use of magnets to secure the wall mount to a magnetic striker plate permanently secured about the telephone service outlet. A guide is rotationally mounted to the base and has means for engaging and locating the mount with respect to the face plate over which the mount ultimately resides. The guide preferably has a pair of spaced apart and longitudinally directed ears connected to the balance of the guide through transverse extending shoulders. The ears register in longitudinal slots in the face plate and the shoulders abut the top of the face plate. This registration and abutment horizontally and vertically locates the mount with respect to the face plate.

The magnets are contained in a magnet frame with a plurality of magnets disposed on either side of the frame's longitudinal axis. The magnet frame has a housing in it for receiving a plug used in making the interconnection with a plug receptacle or jack in the outlet. The plug is freely received in the housing so that it can float and its stabs align themselves with stab receptacles of the jack as the mount swings into place over the face plate. The magnets are preferably contained in a total of four pockets, with two pockets being on each side of the mount. Pole pieces are loosely joined to the magnets and the magnets are permanently installed in the housing. The pole pieces then can move slightly for substantial surface contact with the striker plate.

For removal of the mount, a trigger is provided which preferably comprises a pair of longitudinally extending arms disposed over fulcrums on the base. Actuating ends of the arms are in guides in the base which permit the actuating ends to rotate in planes parallel to a plane containing the longitudinal axis of the mount. The actuating ends have fingers which can bear against the striker plate and pry the mount free of the magnets. The length between the actuating ends and the fulcrum is considerably shorter than the length between the fulcrum and a finger tab connected through a structural connecting piece to the arms in order to provide a mechanical advantage.

These and other features, aspects and advantages of the present invention will become more apparent from the following description, appended claims and drawings.

DESCRIPTION OF THE PREFERRED EMBODIMENT

Figure 1:
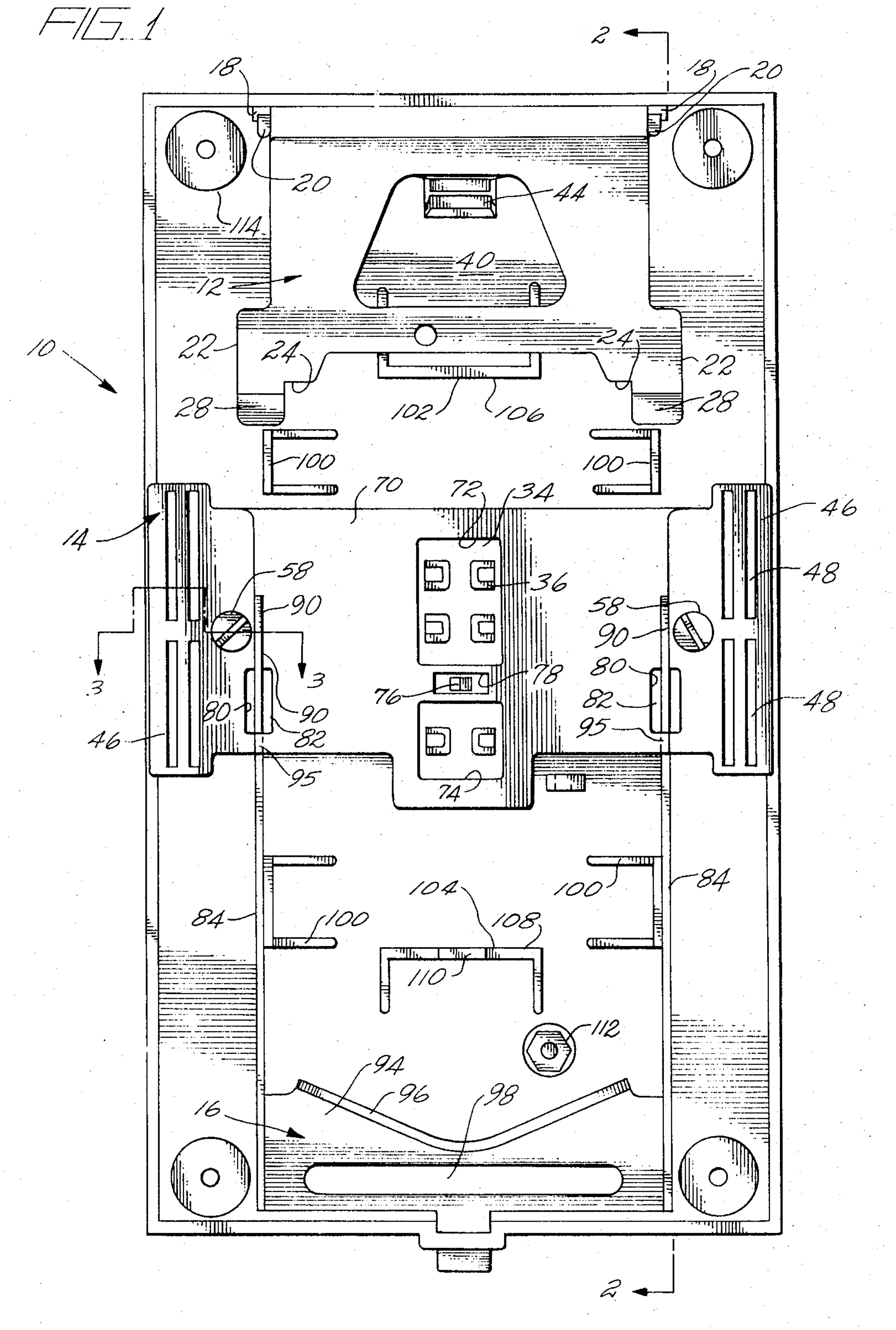
FIG. 1 is a bottom plan view of the preferred embodiment of the telephone wall mount of the present invention.

The wall mount of the present invention is used to mount a telephone to a vertical surface such as a wall over a telephone outlet and to connect the telephone to telephone service of the outlet. In place, the wall mount does not transfer any substantial load to the electrical connecting apparatus between the telephone and telephone outlet, while at the same time masking the electrical interconnection. The wall mount of the present invention also makes it very convenient to install and remove wall mounted telephones.

Briefly, the wall mount of the present invention includes a base 10. The base houses a guide 12 and a magnet frame 14. The base also houses a trigger 16, which is used in removing the mount from a wall.

The guide is pivotally secured to the base through laterally extending pins 18 of the guide journalled in slots of guide mounts 20 of the base. The axis of rotation of the guide is at a right angle to the longitudinal centerline of the mount and parallel to the surface of the base onto which a telephone instrument is mounted. The guide also has a pair of laterally placed, spaced apart, and longitudinally extending ears 22. These ears are offset from the balance of the guide to define horizontally extending shoulders 24. The shoulders have transverse edges for butting up against a horizontal surface of a face plate 26 of the telephone outlet (shown in FIG. 2). Each of the ears has a sloping face, such as indicated by reference numeral 28 in FIG. 2. The face plate with which the wall mount of the present invention is adapted to cooperate has a raised pair of longitudinal flanges, such as indicated by reference numeral 30 in FIG. 2. A slot 31 is defined under each flange. The face plate is secured by any convenient means to a magnet striker plate 32. The mount has a plug 34 with stabs 36. The plug rests in a recess 37 in the ceiling of the base. A plug receptacle or jack which receives the stabs of the plug is behind the face plate. The plug is loosely mounted in magnet frame 14. Telephone service lines extend to this jack and the telephone on the mount is wired into the plug.

Figure 2:
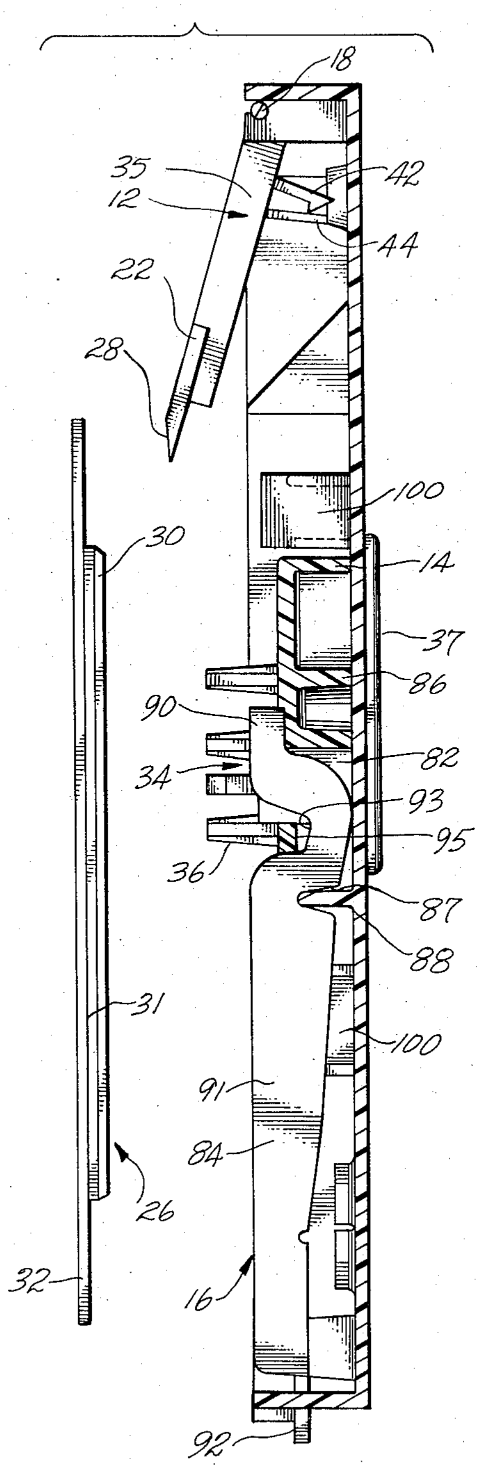
FIG. 2 is an elevational view taken in general along line 2—2 of FIG. 1.

To install the wall mount, the guide is swung outwardly, as indicated in FIG. 2, such that ears 22 are received in respective slots 31 of the face plate. The wall mount is then swung into position flush against the face plate and the magnet striker plate by rotating it about the pivot axis of the guide. While this is happening, the stabs of the plug, by virtue of their float in the magnet frame, are capable of accommodating the angular misalignment between the mount and the plug receptacle.

With this brief description in mind, a more detailed description will be presented.

Figure 4:
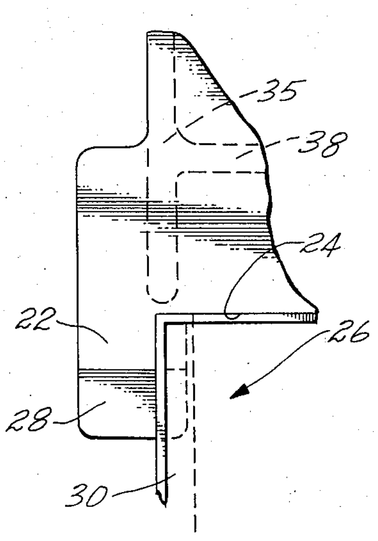
FIG. 4 is a fragmentary plan view detailing the cooperation of the guide and a face plate which are used with the wall mount of the present invention.

Completing the description of the guide, reference should be had to FIGS. 2 and 4. The guide is made rigid by a pair of spaced apart and longitudinally extending ribs 35, one of the ribs being shown in FIG. 2 and the other being partially shown in FIG. 4. These ribs are connected by a pair of transverse ribs, one of which is shown partially in FIG. 4 by reference numeral 38. The transverse ribs extend perpendicular to the longitudinal axis of the mount on either side of a window 40 in the guide.

As is shown in FIGS. 1 and 2, a catch 42 having a hook-shaped head depends from the upper end of window 40 and is disposed to cooperate with a catch 44 of the base having a similar and facing head by engaging the latter and limiting the open position of the guide.

Figure 3:
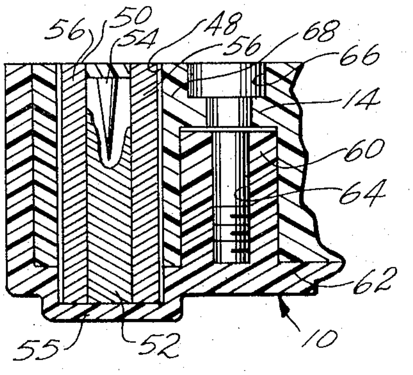
FIG. 3 is an elevational fragmentary view taken generally along line 3—3 of FIG. 1.

With reference to FIGS. 1 and 3, the magnet housing generally has a pair of spaced apart magnet receptacles 46. Each receptacle has two longitudinally spaced pockets 48, each of which receives a magnet. Thus there is a total of four magnets in all. Each of the pockets has two windows for direct contact between a pair of pole pieces employed with the magnets and striker plate 32. Each pocket is separated from its neighbor by a wall 50. With specific reference to FIG. 3, a typical arrangement is shown wherein a magnet 52 in pocket 48 is illustrated in elevational cross section. This magnet is in interference with the magnet frame within the pocket by engagement at each longitudinal end with a pair of generally conically surfaced protrusions 54 in the lateral walls of the pockets, one of such protrusions is illustrated in FIG. 3 in the fragmented section. There, pocket 48 extends into a recess 55 in the ceiling of the base.

The magnet is loosely coupled to a pair of laterally flanking pole pieces 56 such that the pole pieces can rotate within the pockets and with respect to the magnet for full surface contact with the surface of the striker plate. The pole pieces may be made to float in this manner by merely providing a hole in the middle of the magnet and having the pole pieces dimpled with the dimples received in the hole.

Magnet frame 14 is secured to the mount base as through fasteners 58. A preferred arrangement for the fastening is illustrated in FIG. 3. There, a fastener mounting boss 60 extends up from a ceiling 62 of base 10 and has a bore 64 for receipt of fastener 58. A coaxial countersunk fastener hole 66 in a step 68 of the magnet frame provides a shoulder for the head of the fastener.

The magnet frame steps toward the ceiling of the mount from the magnet receptacles and continues with a generally flat surfaced bridge 70 between the receptacles. In the middle of this bridge, there is a pair of cutouts 72 and 74 for receiving the six prongs or stabs 36 of plug 34. A catch 76 of the plug passes through a slot 78 in the bridge. Portions of the magnet frame overlie the plug to capture it.

The magnet frame is cut out at 80 on each interior side of the magnet receptacles for receiving guides 82 of the base and arms 84 of trigger 16.

As is seen in FIG. 2, the magnet frame has a pair of internal, laterally extending reinforcing ribs 86 on either side of fastener mounting bosses 60 of the base. A U-shaped section 93 of each of the arms is offset from the tip 90 and extended portion 91 and rests on the ceiling of the base. A bridge 95 of the magnet frame extends over the U-shaped section of each of the arms to capture the arms. The arms are installed by tucking tips 90 under the bridges and then rotating the arms to the position shown in FIG. 2.

Trigger 16, as previously described, has a pair of longitudinally extending, spaced apart lever arms 84. These arms are slotted at 87 for receipt over fulcrums 88 of the base. Guides 82, which flank the fulcrums, each has spaced, parallel, longitudinal sides to stabilize the arms. Portions of the spaced apart walls extends through cutouts 80 in magnet frame 14. Lever tips 90 of arms 84 are disposed in repose to bear against the magnet striker plate. They have bearing surfaces which are generally parallel with the surface of the plate. The arms of the trigger extend at 91 from the fulcrums longitudinally downward of the mount to an actuating tab 92 disposed there and extending through a lower wall of the base. The length of the arms from the fulcrums downward is greater than the length of the arms from the fulcrums to the ends of the tips.

The arms are interconnected by a bridge in the form of a plate 94 which may have a marginal stiffening rib 96 and a medial stiffening rib 98. The inside of the arms of the trigger are stabilized by guides 100. These guides extend downwardly from the ceiling of the base. The inner surfaces of the vertically oriented faces of guides 100 cooperate with the longitudinal walls of the face plate and provide a means of transferring horizontal loads to the face plate.

Longitudinally spaced apart and laterally extending bosses 102 and 104 of the base each has a lateral wall 106 and 108 perpendicular to the plane of the ceiling of the base. These walls engage cooperating lateral walls of the face plate to transfer vertical loads to the face plate. The upper boss then provides the means for transferring the weight of the wall mount and telephone to the face plate, which of course is secured to the wall. The vertical inner surfaces of guides 100 in combination with walls 106 and 108 are the means of securing alignment of the base to the face plate immediately upon engagement of the magnets to the strikes. Appropriate recesses such as recess 110 in boss 104 can be provided for wiring. Fastening means for the telephone to the base can be provided such as permanently embedded hex head nuts 112 in the base. Feet with bumpers or pads 114 can be provided at the four corners of the mount to cushion the mount against the wall and to provide for some dimensional accommodation.

To install the wall mount of the present invention, guide 12 is positioned such that ears 22 are disposed in the slots of the face plate below the flanges. In FIG. 2, ear 22 is received in slot 31. The bottom of the mount is rested against the wall in which the face plate is mounted and the mount swung around the guide's pivot axis until flush against the wall. During this process, the stabs of plug 34 will register in cooperating receptacles in the jack below the face plate because the ears of the guides maintain proper horizontal orientation of the mount while the steps or shoulders interiorly of the ears bearing on the upper surface of the face plate maintain proper vertical position. The plug, being loosely mounted in the magnet frame, rotates during installation with respect to the mount to accommodate the changing angular relation between the mount and the face plate. When it is time to remove the wall mount, one merely has to press on actuator 92 of trigger 16 to rotate it counterclockwise in FIG. 2 such that tips 90 bear on magnet striker plate 32 to pry the mount loose from the striker plate.

The present invention has been described with reference to a certain preferred embodiment. The spirit and scope of the appended claims, however, should not necessarily be limited to the foregoing description.

What is claimed is:

1. An improved wall mount to mount a telephone on a wall and connect the telephone to a telephone outlet on the wall, the outlet having a jack and a magnetic striker plate, the mount comprising:

a. a base having a face adapted to mount a wall telephone;

b. means in the base for mounting a plug for the electrical connection of the telephone with the jack of the telephone outlet;

c. magnet means in the base to rigidly attach the base to the magnet striker plate of the outlet;

d. guide means in the base to cooperate with the outlet for horizontally and vertically positioning the mount during its installation on the outlet;

e. means for transferring the weight of the wall mount and telephone to the outlet; and f. means for removing the mount from the outlet.

2. The telephone wall mount claimed in claim 1 wherein the outlet has a face plate, the face plate having spaced apart and longitudinally extending slots and an upper horizontal surface, the guide means includes a guide pivotally mounted to the base for rotation about an axis transverse to the longitudinal axis thereof, a pair of spaced apart, longitudinally directed ears on the guide adapted to be received in the longitudinally extending slots in the face plate, and a pair of transversely extending shoulders on the guide adapted to abut the upper horizontal surface of the face plate, the ears providing horizontal orientation of the mount with respect to the face plate and the shoulders providing vertical orientation of the mount with respect to the face plate.

3. The improved telephone wall mount claimed in claim 2 wherein the guide has a catch and the base has a catch disposed to be engaged by the guide's catch to limit the amount of rotation of the guide away from the plane of the base.

4. The improved telephone wall mount claimed in claim 1 wherein the magnet means includes pairs of transversely spaced apart magnets adapted for magnetic flux communication with the striker plate of the outlet.

5. The improved telephone wall mount claimed in claim 1 wherein the magnet means includes a magnet frame disposed in the base, the magnet frame having two pairs of longitudinally spaced apart magnet pockets with the pairs of magnetic pockets being spaced transversely from each other on each side of the longitudinal centerline of the base, a magnet disposed in each of the pockets, and at least one pole piece loosely coupled to each of the magnets such that the pole piece is capable of limited movement to facilitate complete surface contact with the striker plate.

6. The improved telephone wall mount claimed in claim 1 wherein the removal means includes a trigger and a fulcrum, the fulcrum being mounted on the base with the trigger pivotally mounted on the fulcrum, the trigger having a short lever arm extending longitudinally from the fulcrum and disposed to engage a surface of the outlet, a relatively longer actuating arm on the side of the fulcrum opposite from the lever arm, the actuating arm extending longitudinally from the fulcrum and being attached to lever arm, and means for rotating the actuating arm to actuate the lever arm and free the mount from the outlet.

7. The improved telephone wall mount claimed in claim 6 wherein the trigger includes a spaced apart and parallel pair of the lever and actuating arms, a bridge connecting the actuating arms, and the means for rotating the actuating arms includes an actuating tab extending out of a wall at the bottom of the base and attached to the bridge.

8. The improved telephone wall mount claimed in claim 7 including a pair of trigger guides mounted on the base, each guide having a pair of spaced apart, longitudinally oriented walls to define a recess, each of the lever arms residing in an associated one of the recesses, and a bridge over the recess for capturing the lever arms.

9. An improved wall mount for mounting a telephone to an outlet on a wall having a face plate with a pair of vertically oriented, spaced apart longitudinal slots, and a magnet striker plate mounted on the wall on either side of the face plate, the wall mount comprising:

a. a base adapted to mount a telephone;

b. a magnet frame mounted in the base, the magnet frame having two pairs of two magnet receptacles, each pair of magnet receptacles being longitudinally oriented, and the pairs of magnet receptacles being disposed on either side of the longitudinal centerline of the base, a magnet disposed in each of the receptacles;

c. means for mounting a plug in the magnet frame for floating movement with respect thereto, the plug being adapted to electrically connect the telephone instrument mounted on the base with a jack in the outlet;

d. a guide pivotally mounted on the base and having a pair of spaced apart longitudinal ears for registration in the slots of the face plate, and a pair of shoulders extending transversely interiorly of the ears for abutting a horizontal surface at the top of the face plate, the ears and the shoulders providing horizontal and vertical orientation of the wall mount;

e. a trigger for removing the wall mount having a pair of spaced apart longitudinal arms, a short lever portion on each arm disposed for engaging a surface of the outlet and removing the mount therefrom, a longer actuating portion on each arm, a recess between the two portions of each arm, a fulcrum on the base disposed in the recess for rotation of the arms about the fulcrum and the engaging of the surface of the outlet by the lever portion upon one direction of such rotation, a bridge connecting the actuating portions of the arms, an actuating tab connected to the bridge and extending out the bottom of the base for selective actuation of the trigger by rotation of the arms in the one direction, a pair of trigger guides disposed on the base and defining recesses, each recess having a pair of side walls, each of the recesses receiving an associated one of the lever portions, the side walls of each recess transversely stabilizing the lever portion associated with the recess, and a bridge connecting the side walls of each recess and capturing the associated arm; and f. means for transferring the weight of the mount and telephone to the face plate.

10. The improved telephone wall mount claimed in claim 9 wherein the magnet frame has a pair of spaced apart holes therein, the trigger guides extending through the holes and the lever portion of the arms also extending through the holes for engaging the surface of the outlet.

11. The improved telephone wall mount claimed in claim 10 including an arm guide associated with each of the actuating portions of the trigger's arms, each of the arm guides being on the base and defining a vertical surface which stabilizes the inside of its associated actuating portion.

12. The improved telephone wall mount claimed in claim 9 including a pair of longitudinally spaced apart bosses on the base, the spacing between the bosses being substantially equal to the vertical dimension of the face plate, the upper of the bosses being adapted to transfer the weight of the telephone instrument to the face plate and being included in the weight transfer means.

* * * * *